United States Patent

[11] 3,607,421

[72] Inventor John J. Werth
 Franklin, Mich.
[21] Appl. No. 749,185
[22] Filed July 31, 1968
[45] Patented Sept. 21, 1971
[73] Assignee General Motors Corporation
 Detroit, Mich.

[54] FUEL CELL GAS SUPPLY SYSTEM AND METHOD
 9 Claims, 1 Drawing Fig.
[52] U.S. Cl.................................................... 136/86
[51] Int. Cl................................................... H01m 27/14,
 H01m 29/04
[50] Field of Search......................................... 136/86

[56] References Cited
 UNITED STATES PATENTS
 3,350,229 10/1967 Justi............................. 136/86

Primary Examiner—Allen B. Curtis
Attorneys—R. J. Wallace, Lawrence B. Plant and William S. Pettigrew ABSTRACT: Chlorine is stored in a low vapor pressure condition by adsorption on activated charcoal and is continuously released from the charcoal by means of a closed loop recirculation system between the charcoal and the fuel cell. The closed loop system recirculates a quantity of chlorine in excess of that required for electrochemical consumption in the cell. The excess chlorine acts as an efficient heat transfer medium for conducting heat away from the cell and into the charcoal whereby the temperature of the charcoal is increased, more chlorine is released and the pressure in the closed loop maintained. The rate of heat transfer from the cell to the charcoal is controlled by the recirculation rate of the excess chlorine, which is, in turn, controlled by the system's pressure.

PATENTED SEP21 1971  3,607,421
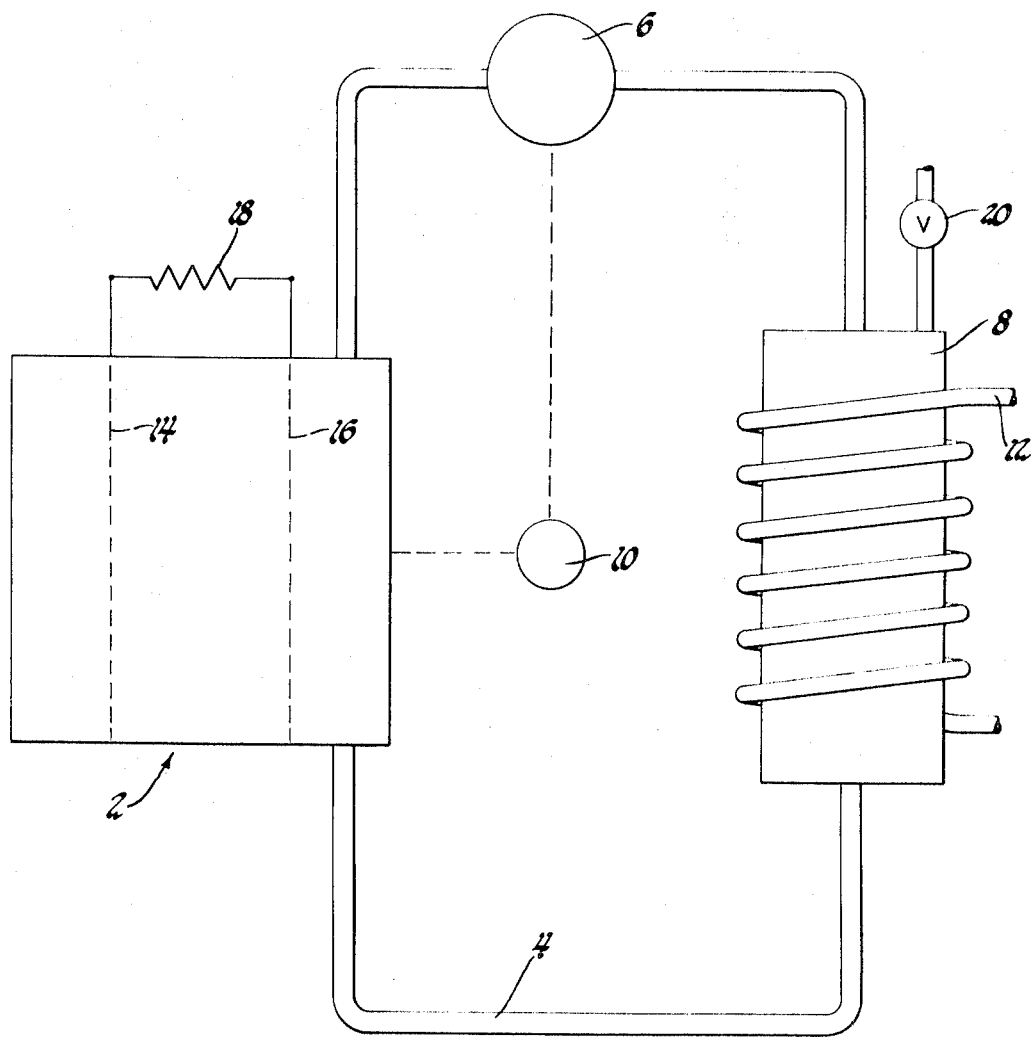
INVENTOR.
John J. Werth
BY
Lawrence B. Plant
ATTORNEY

FUEL CELL GAS SUPPLY SYSTEM AND METHOD

This invention relates primarily to electrochemical cells of the primary and secondary type and principally to a regenerative-type fuel cell system. By regenerative fuel cell system is meant a system in which the reactants may be regenerated using an external energy source. This invention is particularly applicable to those fuel cell systems wherein one of the cell's reactants is a gas. Gaseous fuels or oxidants have always presented a handling problem. It is impractical to store the material at standard temperatures and pressures owing to the volume penalties that must be paid. In this regard for example at 25° C., and 1 atmospheric pressure, it would require about 500 ft.$^3$ of storage space to store enough $Cl_2$ needed for 100 kilowatt hours of stored energy in a Li|LiCl|$Cl_2$ cell system. Basically, two approaches to handling the gaseous materials have been used. The first is the low temperature storage of the material as a liquid. In a rechargeable cell system, this is impractical and further complicates the system by the need for means for liquifying (e.g., compression or refrigeration) the gas. For example at 25° C., chlorine has a vapor pressure of about 8 atmospheres. A second technique for storing gases is to store the gases in an adsorbed state on an adsorbent carrier such as activated charcoal, silica gel, and the like. This technique has been used by Justi in U.S. Pat. No. 3,350,229. To release the gas from the adsorbent carrier, it has been proposed to use electrical heating means which derive energy from the output of the fuel cell. This increases the overall energy loss of certain systems since not only does it take away from the electrical energy of the system, but increases the lost or wasted heat energy of the system. Alternatively, it has also been proposed to use an intermediate fluid and heat exchanger system between the adsorbent carrier and a heat source. This, of course, introduces more losses into the system. In the systems known heretofore, the outlet of the storage container for the absorbent carrier and adsorbed gas is connected by conduit means to the inlet of the gas electrode such that the gas flow is dead ended at the electrode. If the pressure in the conduit falls, additional heat is supplied to the adsorbent carrier by auxiliary heating such as an electrical heater or intermediate fluid and heat exchanger system. By this invention, the auxiliary heating means are eliminated, a very efficient transfer of heat to the adsorbent is obtained, a very efficient mass transfer of the gas from the adsorbent carrier into the gas supply system is attained and cooling of the cell is effected.

Accordingly, it is an object of this invention to provide a gas supply system for a regenerative fuel cell wherein the gas is stored in an adsorbed state on an adsorbent and is released therefrom for use in the cell by a technique which improves heat transfer with the adsorbent, improves mass transfer of gas from and to the adsorbent, reduces the overall system's cooling requirements, and eliminates intermediate and/or auxiliary heating means for supplying heat to the adsorbent.

Briefly stated, this invention relates to a gas supply system for a fuel cell which involves an essentially closed loop gas recirculation system between an adsorbent storage means and the fuel cell which uses the gas. A pumping means is provided to recirculate an excess quantity of the gas between the cell and the adsorbent. By excess quantity is merely meant an amount of gas which is over and above that which is required for consumption at the gas electrode of the cell during discharge thereof. The excess quantity of gas effectively serves as a heat transfer medium between the fuel cell. The excess gas leaving the fuel cell carried with it a proportion of the otherwise wasted heat generated in that cell upon discharge. By passing into intimate contact with the adsorbent, the excess gas efficiently, and with virtually no loss comparable to that experienced with intermediate heat transfer systems, conveys the heat energy developed in the fuel cell to the adsorbent. The adsorbent's temperature is increased causing the desorption of more gas, the adsorbate, into the gas stream. The desorbed gas increases the pressure of the gas in the stream and replaces that which was consumed at the electrode of the cell. System pressure is thereby maintained. The rate of heat transfer to the adsorbent and mass transfer of the gas from the adsorbent is controlled by the recirculation means which involves a substantially closed loop conduit system and a pump which varies the rate at which the excess gas is circulated through the system. The recirculation rate is controlled by a pressure-sensing means in the gas stream which responds to the cell's power demands by monitoring the system's pressure. A system pressure decrease triggers an increased recirculation rate while a pressure increase slows down the recirculation rate below and above a pressure design point. An extremely simple, efficient system results in which otherwise waste heat from the cell is transferred to the desorption chamber wherein it efficiently heats the adsorbent by direct intimate contact therewith and which causes the efficient release of more gas. At the same time, the cell is cooled resulting in a reduction in the overall cooling requirements for the system.

FIG. 1 is a schematic representation of a system embodying the present invention.

FIG. 1 depicts a system containing a regenerative fuel cell 2, a closed loop gaseous reactant circulation system 4, a pump 6, which forms a part of the circulation system 4, and a container and reactor means 8 for containing an adsorbent. A pressure-responsive sensor or control means 10 is provided to sense pressure in the circulation system 4 and vary the pump speed and accordingly the recirculation rate in response to the pressure in the loop 4. Cooling means, such as the coils 12, are provided primarily for use during the initial charging and recharging of the fuel cell system, as will be discussed hereinafter. The fuel cell 2 is depicted as having two electrodes 14 and 16 respectively. A cell load 18 is also shown.

A more detailed discussion of this invention as it relates to an alkali metal |halide| halogen system follows. In the discussion which follows, chlorine will be considered as the reactant gas, activated charcoal as the adsorbent, and lithium as the alkali metal which is the electrochemical counter reactant for the chlorine in the Li-$Cl_2$ couple. Hence, with respect to FIG. 1, electrode 14 can be considered as the anode, or lithium electrode, and electrode 16 as the cathode, or chlorine electrode. While the following discussion is particularly directed toward a Li|LiCl|$Cl_2$ regenerative fuel cell system, it is to be appreciated that the principles discussed are applicable to other systems as well. The charcoal hereinafter referred to is sold as CAL 12×40 by its manufacturer, Pittsburgh Chemical Company, and is basically a bituminous charcoal. The particle size of the charcoal can vary from about 900 microns to about 1,500 microns in diameter with about 1,000 microns being preferred. A bed of this charcoal is porous (i.e., void volume of about 0.94 cm.$^3$/gm.) and contains pores which vary in size from about 10 to about 400 angstroms. These beds have about 1,000–1,100 square meters per gram (M.$^2$/g.) of surface area available for both heat and mass transfer. The adsorption properties of this particular charcoal with respect to $Cl_2$ including the adsorption isobars and isotherms, are published in Advances in Energy Conversion Engineering which reports the papers printed at the Second Annual Intersociety Energy Conversion Engineering Conference held in 1967 at Miami Beach, Fla. It is intended that the applicable portions of the aforesaid publication be incorporated herein by reference for purposes of amplifying this disclosure with respect to the adsorption properties of $Cl_2$ on charcoal. Generally speaking, the data reported therein show that the heat of adsorption for storable chlorine is about 8.08 kcal./g.-mole $Cl_2$ based on the use of 100 g. of CAL 12×40 charcoal. The data indicate that the heat of adsorption does not vary appreciably over the temperature ranges experienced in the normal discharge cycle of a Li | LiCl|$Cl_2$ system, and that the heat required to desorb the $Cl_2$ from the charcoal is less than 15 percent of the total reaction energy between the chlorine and the lithium. Accordingly, except at very small discharge rates, the thermal losses in the cell are more than enough to supply the desorption energy.

The following is a specific example of a system operating in the galvanic mode in accordance with this invention. To accomplish a mission requiring 100 kilowatt hours (kw.-hr.) of energy with a system operating at 2 atmospheres $Cl_2$ pressure, approximately 200 pounds of CAL 12×40 charcoal is required. At 25° C., which is the typical prestartup storage temperature of this system, this charcoal will hold about 130 pounds of $Cl_2$. The mission will require about 100 pounds of this $Cl_2$. Just prior to going into operation, the cell is heated to its operating temperature and the system pressurized to the design pressure (2 atm.) from an outside source of chlorine, (e.g., through valve 20). At 2 atmospheres pressure the charcoal's temperature must be raised from 25° C., to 400° C., during the course of the mission to release the required 100 pounds of $Cl_2$ to meet the 100 kw.-hr. requirement. The rate of release of chlorine of course will vary with the discharge rate or power demands placed on the system. For the 100 kw.-hr. mission, only about kw.-hr. pounds of $Cl_2$ or less is in transit in the system at any one time. About 30 pounds of $Cl_2$ remains on the charcoal at the end of the mission unless the charcoal temperature is raised to above 400° C. An excess flow rate of 2 to 1 is used. That is to say, twice as much chlorine is fed to the cell as is consumed electrochemically. For a normal power drain of about 33 kw. this would amount to a $Cl_2$ flow rate of about 1.3 lb./min. At temporary peak power drains of about 200 kw., the flow rate would be about 9.2 lb./min. The $Cl_2$ pressure is maintained by transferring otherwise waste heat generated in the cell during the cell discharge reaction to the charcoal (adsorbent). The charcosl's temperature is raised to the point where the vapor pressure of the chlorine (adsorbate) is equal to the desired system pressure. To insure that the proper amount of heat is transferred, a pressure sensor is used to sense the pressure in the $Cl_2$ stream. The sensor also controls the circulation rate of the gas stream. The pressure sensor may be a bipolar electrical signal which either starts or stops the recirculation pump or the recirculation rate can be made proportional to the pressure signal in a smooth, continuous control. The sensor responds to deviations on the high or low side from a design pressure point (e.g., 2 atm.). If the pressure is too low, the circulation rate is increased, thus causing more (e.g., to flow from the cell 1) the charcoal (adsorbent) which in turn raises the pressure. If the pressure is too high, the sensor slows down or may even stop the recirculation of the chlorine, and the pressure will decrease. At high power drains, the chlorine is consumed rapidly, and the charcoal tends to cool. As it cools, the pressure falls. When this happens, the recirculation is increased to meet the system's demands for both heat and chlorine.

If the cell discharge rate is appreciable, but constant, the $Cl_2$ recirculation rate will also be essentially constant since the recirculation rate is roughly proportional to the heat loss in the adsorbent per unit time. This heat loss is equal to the sum of the thermal leakage through the insulation around the adsorbent and the heat of desorption. At normal discharge levels, the thermal leakage is negligible compared to the heat of desorption which itself does not vary appreciably over the discharge cycle. Generally speaking, however, it is expected that the circulation will increase somewhat from the beginning to the end of the discharge cycle as the adsorbed chlorine becomes more depleted. In any event the pressure sensor will automatically adjust the recirculation rate to the proper value required to maintain system pressure. An excess flow rate of about 2 to 1 appears to be adequate for the $Cl_2$ charcoal system. Clearly, higher excesses (e.g., 5 to 1) may be used when the recirculation rate is adjusted to accommodate these higher excesses. Whatever excess ratio is established for the system, it should remain relatively constant during operation of the system. The more chlorine that is consumed in the cell, the more heat must be transferred to the charcoal to release the needed chlorine. The amount of heat transferred to the charcoal is roughly proportional to the total flow rate of chlorine through the cell and, therefore, the excess chlorine ratio tends to be somewhat constant. The heat transfer characteristics of the system as a whole, and especially the cell manifold, will better determine which ratio is best for each system. Generally the better the heat transfer from the cell to the gas, the lower the ratio can be.

A further benefit is obtained when in a regenerative system, and during regeneration, the cell is at a lower temperature than the charcoal (e.g., an aqueous $Zn-Cl_2$ system). In recharging such a system, current is applied to the cell which, in effect then becomes an electrolysis cell. $Cl_2$ is generated at the $Cl_2$ electrode, removed from the cell and adsorbed onto the charcoal. Heat is generated when the chlorine is adsorbed on the charcoal. If more $Cl_2$ is present than is being adsorbed, it can, by recirculation, carry the heat back to the cell where it contributes to the $T\Delta S$ energy requirements of the regeneration reaction.

For a comparatively rapid recharge of the $Li|LiCl|Cl_2$ system, it is desirable to initially cool the charcoal, as by means of cooling coils 12 or the like. This improves the adsorption rate. On recharge, the pressure in the gas stream is low owing to the loss of the $Cl_2$ from the stream to the charcoal. This enhances the transfer rate of the $Cl_2$ through the $Cl_2$ electrode 16 and into the gas stream.

An additional, and very significant, benefit obtained from this system which is not found in systems wherein the $Cl_2$ is merely dead ended at the $Cl_2$ electrode 16 is the scavenging effect of the excess $Cl_2$ flow. Chlorine, like most gases, contains impurities. By continuously recirculating the gas, the tendency for these impurities to plug, and thereby polarize, the $Cl_2$ electrode is reduced substantially. The bulk of the impurities tend to remain in the gas stream for a substantially longer period of time. Further impurity reduction results from the adsorption-desorption process itself which causes some of the impurities to be retained on the charcoal.

While I have disclosed my invention primarily in terms of a specific embodiment thereof, it is understood that other materials, such as silica gel, activated $Al_2O_3$ diatomaceous earth, etc., might well be used as the gas adsorbent and other gases, such as hydrogen, oxygen, other halogens, etc., might well comprise the adsorbate. Likewise, by the mere fact that activated charcoal is particularly well suited for use with chlorine, it is not intended that my invention be restricted to the precise embodiment disclosed but rather only to the extent hereinafter delimited.

I claim:

1. A method of supplying a gas to an electrochemical cell for consumption therein said gas being supplied at a predetermined pressure and from a gas source in which said gas is stored in an adsorbed state on an adsorbent, said method comprising the steps of:
    providing a stream of said gas at said pressure and containing a quantity of said gas in excess of that needed for consumption is said cell;
    recirculating said stream in a closed loop between said cell and said adsorbent, said stream being in direct intimate contact with said adsorbent for efficient mass and thermal transfer between said adsorbent and said stream;
    transferring heat generated on discharge of said cell to said stream as it circulates through said cell to cool said cell;
    transferring said heat from said stream directly into said adsorbent while it is in contact with said adsorbent to raise said adsorbent's temperature and desorb more of said gas into said stream to maintain said predetermined pressure; and varying the recirculation rate of said stream to maintain said pressure.

2. The method as claimed in claim 1 wherein said recirculation rate is varied in response to pressure changes of said stream.

3. The method as claimed in claim 2 wherein said gas is chlorine and said adsorbent is activated charcoal.

4. The method as claimed in claim 3 wherein said stream contains at least about two times the amount of chlorine as is needed for consumption in the cell.

5. An alkali metal|fused alkali metal halide|halogen electrochemical cell and halogen supply system therefor comprising:
    an electrochemical cell having a first electrode for said alkali metal, and a second electrode for said halogen;

a storage means for said halogen, said storage means including an adsorbent for holding said halogen in an adsorbed state on its surface;

a closed loop recirculation system for recirculating an excess quantity of said halogen between said cell and said storage means, said excess being an amount in addition to that required for consumption is said cell and being provided as a heat transfer medium between said cell and said storage means;

pump means in said recirculation system for effecting the recirculation of said excess halogen between said storage means and said cell at a rate which is responsive to the pressure of said halogen in said system in order to control the rate of heat transferred from said cell to said storage means; and means for sensing the halogen pressure in said system and controlling said recirculation means so that the heat transferred from the cell to the adsorbent will cause sufficient description of said halogen to maintain a design pressure in said system.

6. The cell as defined in claim 5 wherein said alkali metal is lithium, said halide is lithium chloride, said halogen is chlorine and said adsorbent is activated charcoal.

7. The cell as defined in claim 6 wherein said adsorbent is a bituminous activated charcoal having a particle size of about 900 to about 1,500 microns, a pore size distribution of between about 10 to about 400 angstroms and a mass and heat transfer surface area of about 1,000 to about 1,100 square meters per gram of charcoal.

8. A method of operating a regenerative fuel cell in which one of the components of said cell's electrochemical couple is a gas which is adsorbable and desorbable on and from an adsorbent for storage and release of said gas upon demand, and which method involves alternately cycling said system between a discharge cycle in which said gas is desorbed from said adsorbent and piped to said cell and a recharge cycle in which said gas is generated in said cell, piped to and adsorbed on said adsorbent, said method including the steps of: continuously transferring heat generated in said cell to said adsorbent during said discharge cycle by recirculating a sufficient excess quantity of said gas in a substantially closed loop between said cell and said adsorbent to automatically raise the temperature of said adsorbent sufficiently to maintain a substantially predetermined pressure of said gas in said system.

9. A fuel cell system for the electrochemical consumption of a gas comprising a fuel cell having an electrode for generating electrical energy from said gas and a supply system for said gas; said supply system comprising storage means including an absorbent for holding said gas in an adsorbed state on its surface; a closed loop recirculation system for circulating an excess quantity of gas between said cell and said storage means, said excess being an amount in addition to that required for consumption in said cell and being provided as a heat transfer medium between said cell and said storage means; pump means in said recirculation system for effecting recirculation of said excess gas between said storage means and said cell at a rate which is responsive to the pressure of said gas in said system in order to control the rate of heat transferred from said cell to said storage means; and means for sensing the condition of said gas in said system and controlling said recirculation means so that the heat transferred from the cell to the adsorbent will cause sufficient desorption of said gas to maintain a predetermined pressure in said system.

PO-1050
(5/69)

UNITED STATES PATENT OFFICE
CERTIFICATE OF CORRECTION

Patent No. 3,607,421          Dated September 21, 1971

Inventor(s)          John J. Werth

It is certified that error appears in the above-identified patent and that said Letters Patent are hereby corrected as shown below:

In the specification, Column 1, line 11, "atmospheric" should read -- atmosphere --; line 65, "carried" should read -- carries --. Column 2, line 64, "kcal." should read -- kCal. --. Column 3, line 15, "kw.-hr." should read -- 0.5 lbs --; line 27, "charcosl's" should read -- charcoal's --; line 39, delete "(e.g., to flow from the cell 1)" and insert after "more" -- heat to flow from the cell to --.

In the Claims, Claim 5, line 19, "description" should read -- desorption --. In Claim 9, line 19, after "of" insert -- said --.

Signed and sealed this 11th day of April 1972.

(SEAL)
Attest:

EDWARD M. FLETCHER, JR.          ROBERT GOTTSCHALK
Attesting Officer          Commissioner of Patents